United States Patent [19]

Fowler et al.

[11] 4,168,716
[45] Sep. 25, 1979

[54] SOLAR-POWERED THERMIONIC-PHOTOELECTRIC LASER

[76] Inventors: Herbert Fowler, P.O. Box 11431, Lexington, Ky. 40511; Allan Israel, P.O. Box 5627, Lexington, Ky. 40505

[21] Appl. No.: 860,905

[22] Filed: Dec. 15, 1977

[51] Int. Cl.² .......................... H01L 35/00; H01S 3/00
[52] U.S. Cl. ............................ 136/206; 136/89 HY; 136/223; 331/94.5 R; 331/94.5 P
[58] Field of Search .................. 136/89 HY, 206, 223; 331/94.5 R, 94.5 P

[56] References Cited

U.S. PATENT DOCUMENTS

| | | | |
|---|---|---|---|
| 2,864,879 | 12/1962 | Toulmin, Jr. | 136/206 |
| 3,070,643 | 12/1962 | Toulmin, Jr. | 136/206 |

Primary Examiner—Leland A. Sebastian
Attorney, Agent, or Firm—Littlepage, Quaintance, Murphy, Richardson and Webner

[57] ABSTRACT

A solar-powered thermionic-photoelectric current generator is disclosed employing a paraboloidal telescope for collecting and concentrating sunlight into a narrow beam which is incident upon a thorium-doped tungsten cathode target within an evacuated envelope, the light being incident on the target at a very large angle of incidence. An anode arranged substantially parallel to the beam of light incident on the cathode target surrounds the major portion of the cathode target and extends an appreciable distance rearwardly from the cathode target. A gas impervious envelope maintains the region of space immediately surrounding the anode and cathode target at a desired vacuum. Electrical conductors leading from the anode and cathode target to points outside the gas impervious envelope can connect the anode and cathode target to an appropriate load. A laser or other similar light amplification means can be included to increase the proportion of light incident about the target which is found in the ultraviolet spectrum.

12 Claims, 4 Drawing Figures

SOLAR-POWERED THERMIONIC-PHOTOELECTRIC LASER

BACKGROUND OF THE INVENTION

1. Field of the Invention

The present invention relates generally to solar energy conversion systems and more particularly systems employing both thermionic and photoelectric mechanisms for generating current.

2. Description of the Prior Art

From the early experiment of Becquerel, Guthrie, Edison and others, it was known that by heating a metal, it is possible to "evaporate" ions or electrons from the metal. This electron or ion emission is related to the temperature of the emitting metal. It has been found that at lower temperatures the thermionic emission from metals is predominantly positive but that at much higher temperatures the negative or electron emission rapidly surpasses the positive and becomes all-important. It is thought that the initial positive emission from metals is largely due to impurities and the positive emission is seen to decrease as a function of time even where the temperature of the metal is held such that predominantly positive emission would be expected.

It has been observed that some metals emit electrons much more copiously than others. A notable example is thorium, an observed film of which on tungsten gives very copious electron emissions at high temperatures. This high temperature electron emission generally follows the Richardson-Dushman equation:

$$I_s = AT^2 e^{-B/T}$$

$I_s$ is the thermionic current density. A is a proportionality constant which for thoriated tungsten is about 3. T is the absolute temperature while e is the base of natural logarithms. B is a constant equal to the work function of the metal divided by the Boltzmann constant. For thoriated tungsten the valve of B is approximately 30500. Thus, for all practical purposes, the generation of usable levels of current occurs only when the emitting metal has a temperature somewhere above 1500° K.

The electron emission from a metal can also be achieved photoelectrically. As first observed by Hertz, first experimentally quantified by Lenard, and satisfactorily explained by Einstein, electrons in the surface of a metal receive sufficient energy to escape from the metal when an electromagnetic wave such as light is incident upon the metal surface. The emission of the electrons is not dependent upon the emitting metal's temperature but is rather dependent upon the presence of electromagnetic radiation having a frequency greater than that value found from the quotient of the work function of that metal divided by Planck's constant. This minimum frequency may be translated as a maximum wave length of light which falling on a metal will cause electron emission. In the case of thoriated tungsten the maximum wave length is about 4700 Angstroms. Thus, for thoriated tunsten, photoelectric emission could be expected only from light in the deep-blue, violet, and ultraviolet areas of the spectrum. Further, it is observed that as the wave length of the impinging light moves increasingly toward the ultraviolet, the electrons emitted from the metal are more energetic while the current generated for any given light intensity remains unchanged with respect to variations in color. On the other hand, the photoelectric emission current is directly related to the intensity of the light incident upon the photoelectric target.

It is an object of the present invention to use both thermionic and photoelectric emission from a target so as to enhance the current generating capabilities of a physical system which might utilize either effect alone. It is a further object of this invention to physically construct a target and its surrounding environment so as to maximize both the photoelectric and thermionic emission effects.

It will be appreciated that with respect to solar powered energy sources employing combined thermionic and photoelectric effects, an increased efficiency in current production could be achieved if a greater proportion of the spectrum of light incident upon the target had a frequency greater than that minimum frequency necessary to cause photoelectric emission. Thus, it is another object of the present invention to design a solar-powered thermionic-photoelectric current generator which includes an appropriate light amplification means so as to shift a portion of the incident light spectrum toward the ultraviolet region thereby causing increased photoelectric emission current. This increase in photoelectric emission current is recognizably achieved only at some loss in the thermionic emission current. It is believed that an overall increase in current will be realized based on the greater efficiency of the photoelectric effect over that of the thermionic effect.

A problem common to both the photoelectric and thermionic production of current is the existence of a space charge which may be viewed as a gaseous sea of electrons concentrated just above the surface of the emitting metal which acts as a retarding potential to significantly decrease if not stop entirely the current which would ordinarily be produced. Various mechanical arrangements principally of shorting screens or grids have been proposed which would materially reduce the space charge thereby enhancing the current. None of these mechanical arrangements of screens or grids has performed satisfactorily. It is therefore an object of the present invention to enhance the current production by thermionic and photoelectric effects by so forming the target that the space charge of electrons can be continuously swept away from the target by the radiation pressure of the light incident upon the target at very large angles of incidence.

Generally, electromagnetic radiation possesses momentum and therefore exerts a pressure on objects on which it impinges. The effect of this pressure is most conspicuous in the case of a comet near the sun where the radiation pressure from the sun forces the lighter constituents of the comet away from the sun. While the radiation pressure from the sun on the surface of the earth is very small (about $10^{-9}$ newtons/meter$^2$), when the sunlight incident upon a diverse area is collected and concentrated into a very narrow beam, this radiation pressure increases in direct proportion to the reduction in area. Even with the substantial reduction in area which is intended by the present invention, the radiation pressure remains very small as measured in absolute terms. However, when it is considered that this very small radiation pressure is going to act on the extremely small mass of the electrons forming the space charge adjacent the target, it will be appreciated that a substantial acceleration will be experienced by the electrons which will in turn move the electrons to a region of the current generator where they will no longer inhibit the thermionic-photoelectric current generation but rather contribute to it.

SUMMARY OF THE INVENTION

The present invention seeks to achieve these several objects and overcome the previously discussed difficulties by constructing a solar-powered thermionic-photoelectric current generator which comprises a light collecting means for collecting light incident upon a diverse area and concentrating that light into a narrow beam projecting along an optical axis. A cathode target, preferably of thoriated tungsten, is positioned so as to intercept a major portion of the narrow beam of light. The cathode target is preferably formed and situated such that the narrow beam of light strikes the target at a very large angle of incidence from the normal to the surface of the target. An anode is arranged substantially parallel to the beam of light and surrounds a major portion of the cathode target. The anode preferably extends a substantial distance to the rear of the cathode target as viewed from the direction of the incident narrow beam of light. The cathode target, anode, and region of space immediately surrounding the anode and cathode target are contained within a gas impervious envelope for maintaining that region of space at a desired vacuum. Appropriate electric conductors lead from the anode and from the cathode target to points outside of the gas impervious envelope for connecting the anode and cathode target to an appropriate electrical load.

A solar-powered thermionic-photoelectric current generator according to the present invention can further comprise a columnating means positioned between the light collecting means and the cathode target for columnating the narrow beam of light. This columnating means can take the form of a columnated light amplification means which increases the proportion of light incident upon the cathode target which is within the ultraviolet portion of the spectrum thereby maximizing the photoelectric current generation.

The apparatus can also further comprise a reflecting surface for focusing light passing by or reflected from the cathode target back toward the cathode target. In a preferred embodiment, this reflecting surface constitutes a concave mirror constructed so as to reflect the bypass light toward an open conical surface of the cathode target which acts as a black body to absorb all of this reflected light energy and transform it into heat energy thereby enhancing the thermionic emission from the cathode target.

These general features of the present invention together with more particular features of various embodiments of the invention will become apparent to those skilled in the art upon consideration of the following description taken in conjunction with the accompanying figures.

DESCRIPTION OF PREFERRED EMBODIMENTS

Figure 1:
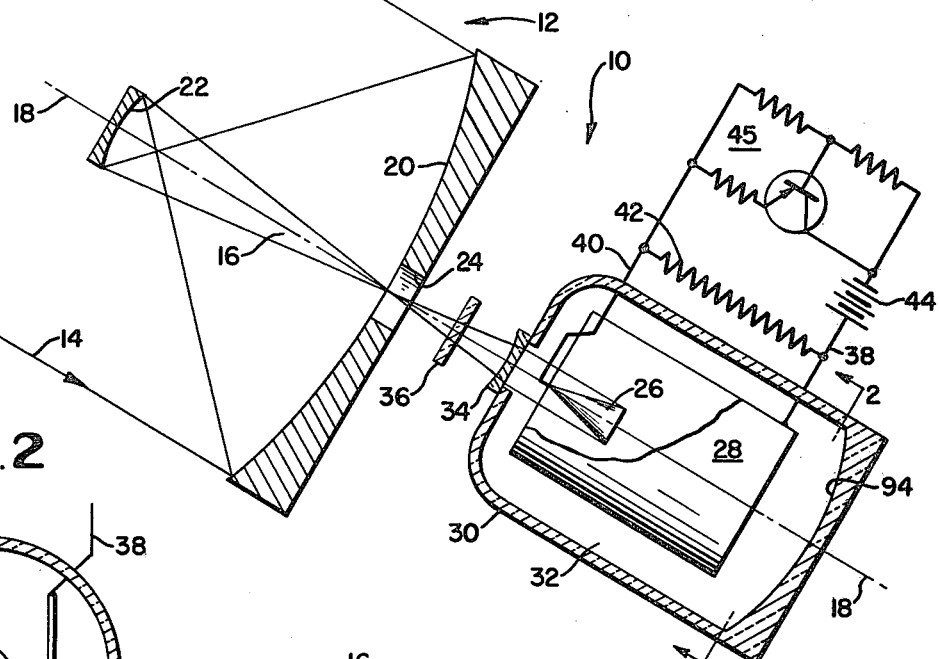
FIG. 1 is a schematic representation of a solar-powered thermionic-photoelectric current generator according to the present invention.

A solar-powered thermionic-photoelectric generator 10 according to the present invention is illustrated in FIG. 1. The apparatus 10 comprises a light collecting means 12 for collecting light indicated by arrows 14 incident upon a diverse area and concentrating that light into a narrow beam 16 projecting along an optical axis 18. The illustrated preferred embodiment of the light collecting means 12 incorporates a paraboloidal reflecting telescope such a Newtonian, Cassegrainian, Gregorian or Coude. Each of these instruments uses a paraboloidal principle reflecting surface 20 together with a secondary reflecting surface 22 to form the very narrow beam of light 16. This narrow beam 16 typically passes through an aperture 24 to the remaining portions of the apparatus 10.

A cathode target 26 is positioned so as to intercept substantially all of the narrow beam of light 16. The cathode target is preferably of a metal chosen for its superior performance in both thermionic and photoelectric emission of electrons, e.g., thoriated tungsten. While this cathode target might have other possible configurations, one preferred shape for this target is that of a cone. This preference will be explained later in connection with FIG. 4.

Figure 2:
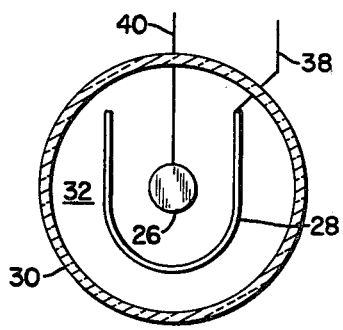
FIG. 2 is a sectional view of a portion of the apparatus illustrated in FIG. 1 taken along line 2—2.

An anode 28 is arranged substantially parallel to the beam 16 of light incident on the cathode target 26. The anode 28 surrounds at least a major portion of the cathode target 26. The anode 28 extends a substantial distance to the rear of the cathode target 26 as viewed from the direction of the incident beam of light 16. This extension of the anode 28 is viewed in FIG. 1 as that portion of the anode extending to the right of cathode target 26. It may be seen from FIG. 2, which is a sectional view of the apparatus illustrated in FIG. 1 cut along lines 2—2, that the anode 28 constitutes a U-shaped trough with the cathode target 26 situated in the approximate center of the space engulfed by the U-shaped trough.

A gas impervious envelope 30, preferably of Corning PYREX, contains the cathode target 26, anode 28, and region of space 32 immediately surrounding the anode and cathode target for maintaining that region of space 32 at a desired vacuum. The gas impervious envelope includes an ultraviolet transmitting portion 34 aligned so as to permit the ultraviolet portion of the light beam 16 to enter the envelope 30 and strike target 26. In certain instances, it may be desirable that portion 34 exclude some or all of the visible portion of the spectrum. When this result is desired, portion 34 may be more desirably formed of Corning glass number 5970. Ultimately, this or other filtering may be performed by a separate filter 36 positioned in the beam 16 between aperture 24 and the ultraviolet transmitting portion 34. Either filter 36 or portion 34 should preferably be shaped in such a way as to columnate the light beam 16.

Electrical conductors 38 and 40 lead from anode 28 and cathode 26 respectively to a point outside envelope 30 to connect the apparatus 10 to an appropriate load 42. Additionally, a battery or other power source 44 together with appropriate switching circuitry 45 can be included to insure consistent operational characteristics.

Figure 3:
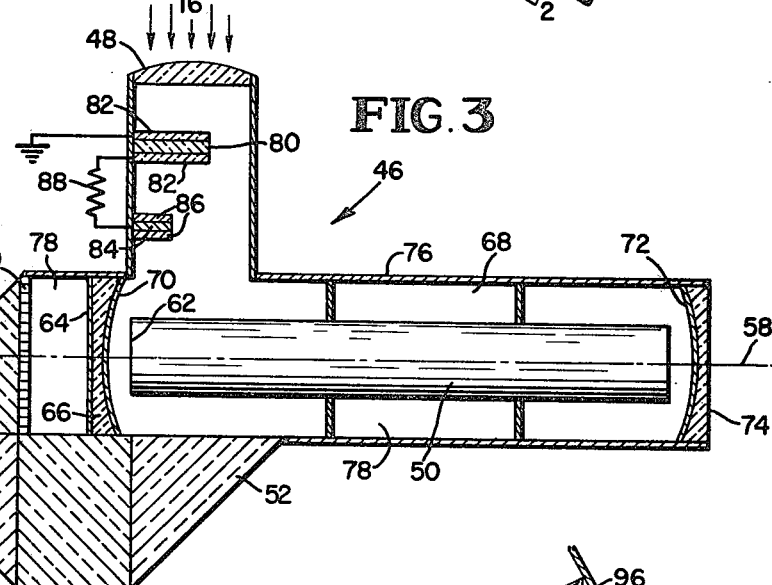
FIG. 3 is a further schematic representation of one embodiment of a solar-powered thermionic-photoelectric current generator according to the present invention incorporating a light amplification means.

As has been previously stated, thermionic current generation occurs at reasonable current levels only where the emitting cathode target has a temperature somewhere above 1500° K. Whereas, the photoelectric emission of electrons will occur at any temperature so long as the wave length of the impinging light is sufficiently short. It is therefore desirable to maximize the amount of light in short wavelength violet and ultraviolet regions so as to maximize this photoelectric effect. The beam of light 16 which may be previously filtered by an appropriate filter 36, is caused to impinge on a light amplification means 46 illustrated generally in FIG. 3. The light amplification means 46 can be used for increasing the proportion of light incident upon the cathode target 26 of the apparatus illustrated in FIG. 1, or may alternatively be used in combination with the light collecting means 12 for still other purposes requiring high energy ultraviolet sources. The light beam 16 from light collecting means 12 or other similar source enters the light amplification means 46 through columnating lens 48. The columnating lens 48 will preferably be wavelength selective so as to reject those wavelengths of light which might represent undesirable "noise" for the light amplifying system.

The light passing through columnating lens 48 is then incident upon, and operates as the pumping source for, laser 50. Laser 50 can be any type of laser such as neutral or ionized molecular gas, dye, or rare earth liquid so long as the output of that laser is principally in the ultraviolet portion of the spectrum. That portion of the light which passes perpendicularly downward through laser 50 passes into a series of prisms 52, 54, and 56, which are preferably made of General Electric fused quartz number 125 The prisms are constructed so as to totally internally reflect the light and redirect that light in an axial direction along axis 58. The apparatus 46 can include a diffraction grating 60 to further optimize the output from the stimulated emission of laser 50. The light, which is now axially aligned with axis 58, enters the left end 62 of laser 50 after passing through an anti-reflective coating 64 and rear partially reflecting surface 66 of the laser 50. Within the light amplification chamber 68 the appropriate standing wave action is established between the highly reflecting surface 70 and partially reflecting surface 72 necessary to sustain the operation of laser 50. The amplified light output of the apparatus 46 exits from end 74 of the apparatus for further use consistent with the present invention.

The entire light amplification apparatus 46 is contained within an envelope 76 able to maintain the enclosed space 78 at an appropriate vacuum. The light amplification means 46 as previously described operates in a continuous wave mode. In appropriate circumstances it may be desirable to operate this appartus in a pulsed mode.

When this pulsed mode operation is desired, a liquid crystal 80 sandwiched between two layers of quartz 82 is positioned so as to intercept approximately two thirds of the light entering the amplification means 46 through columnating lens 48. The liquid crystal 80, anisylidene-para-aminophenylacetate, will permit ultraviolet light to pass through it when it is in a clear state. However, when the liquid crystal has a small electrical current passing through it the liquid crystal becomes opaque to ultraviolet light. Below the liquid crystal 80 is situated a polished aluminum absorber 84 sandwiched between two sheets of mica 86. The polished aluminum layer 84 is situated such that light must pass through liquid crystal layer 80 before hitting the aluminum layer 84. In a preferred embodiment the aluminum layer would occupy only a minor portion, say one third, of the total light input cross section from lens 48. The aluminum and mica layered device operates as a UV actuated power source to cause current to flow through the liquid crystal layer 80. The power source is only operative when the liquid crystal layer 80 is transparent to ultrviolet light. Alternatively, the liquid crystal layer 80 becomes opaque to ultraviolet light when current is passed through it. Therefore, with the addition of appropriate external time-constant circuitry 88 it will be recognized that a rapid oscillation can be set up in liquid crystal layer 80 which will in turn modulate the light incident upon laser 50. In this fashion the light amplification means 46 can be operated in a pulsed rather than continuous wave mode of operation.

Figure 4:
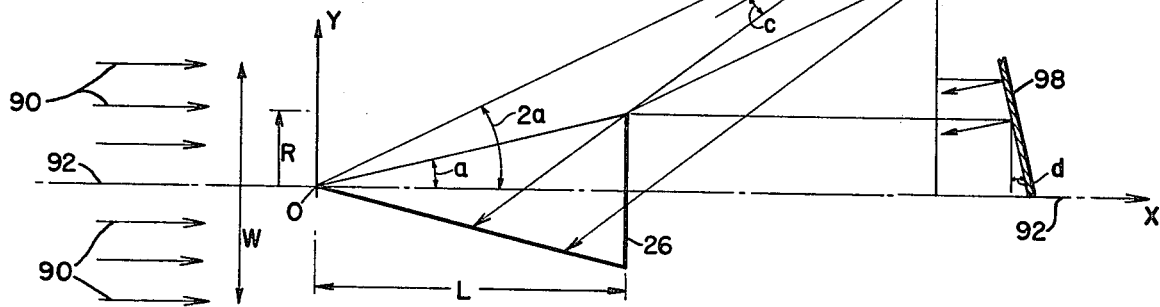
FIG. 4 is a line drawing illustrating the relationship between the cathode target and the reflecting surface positioned behind the cathode target designed to maximize the thermionic current generation.

The output from the light amplification means 46 or, if desired, the direct light beam 16 after being columnated, can then be focused upon the cathode target 26 as previously discussed. The columnated beam of light is illustrated in FIG. 4 as a series of parallel rays of light 90 having a total beam width W. This light is then incident upon a cathode target 26 which in the line drawing of FIG. 4 is simply a cone aligned with axis 92, with its apex at 0, of length L, and of maximum radius R at an angle of incidence from the surface normal of greater than 45°. It will be noted that the relationship between the length L of the cathode target 26 and the maximum radius R is such that $\tan a = R/L$. The rays of light which are incident upon the sides of the cathode target will either react photoelectrically with the electrons making up the surface of the cathode target or will specularly reflect at an angle $2a$. If the angle $a$ preferably kept very small, i.e., 15° or less, then the photopressure operating essentially parallel to or at very small angle from the surface of the cathode target 26 is sufficient to remove any electrons which might tend to form a space charge in the immediate vicinity of the cathode target. Further, by arranging the anode 28 of the device as illustrated in FIG. 1 a substantial distance to the rear of the cathode target, the emitted electrons are in such a position as to be only under the influence of the anode 28 and thus can be more efficiently collected by the anode.

An added feature of this design is further provided by a reflecting surface illustrated in FIG. 1 as 94 for focusing the light passing by, or reflected from, the cathode target 26 back toward the rearwardly facing conical opening of the target 26. The reflecting surface 94 is made of two portions graphically illustrated in FIG. 4 as 96 and 98. It will be appreciated that the two portions 96 and 98 can be incorporated into a single surface of the appropriate dimensions and curvature as generally illustrated in FIG. 1. Portion 96 of the reflecting surface is designed to reflect the light which is previously reflected from the surface of cathode target 26 back toward the open conical end of cathode 26. A careful consideration of the geometric relationships present will reveal that the surface angle b of portion 96 of the reflecting surface is given by the equation:

$$b = a + \tfrac{1}{2} \arctan((x\tan 2a - R)/(x - R\cot a)) \qquad (1)$$

Portion 98 of the reflecting surface is designed to reflect any small portion of light which might pass by cathode target 26 unreflected from its surface. If the maximum radius of R of cathode target 26 were equal to or greater than the half-width, W/2, of the entering beam of light then portion 98 would not be required. From a similar consideration of the geometric relationships involved, the equation for the surface deflection angle d of surface 98 is given by:

$$d = \tfrac{1}{2} \arctan (R/(x - R\cot a)) \qquad (2)$$

Although the invention has been described in considerable detail with reference to certain preferred embodiments thereof, it will be understood that variations and modifications can be effected within the spirit and scope of the invention as described above and as defined in the appended claims.

What is claimed:

1. A solar-powered thermionic-photoelectric current generator comprising:
   (a) light collecting means for collecting light incident upon a diverse area and concentrating that light into a narrow beam projecting along an optical axis.
   (b) a cathode target positioned so as to intercept a major portion of the narrow beam of light,
   (c) an anode arranged substantially parallel to the beam of light incident on the cathode target and surrounding a major portion of the cathode target,
   (d) a gas impervious envelope containing the cathode target, anode and region of space immediately surrounding the anode and cathode target for maintaining that region of space at a desired vacuum, and
   (e) electrical conductors leading from the anode and from the cathode target to points outside of the gas impervious envelope for connecting the anode and cathode target to an appropriate load.

2. The apparatus of claim 1 further comprising a columnnating means positioned between the light collecting means and cathode target for columnnating the narrow beam of light.

3. The apparatus of claim 1 further comprising light amplification means situated between the light collecting means and the cathode target for increasing the proportion of light incident upon the cathode target which is within the ultraviolet portion of the spectrum.

4. The apparatus of claim 1 wherein the light collecting means comprises a paraboloidal reflecting telescope.

5. The apparatus of claim 1 wherein the cathode target is formed and situated such that the narrow beam of light strikes the target at an angle of incidence from the normal of greater than 45°.

6. The apparatus of claim 1 wherein the anode extends a substantial distance to the rear of the cathode target as viewed from the direction of the narrow beam of light incident on the cathode target.

7. The apparatus of claim 1 wherein said gas impervious envelope further comprises a reflecting surface for focusing light passing by or reflected from the cathode target toward the cathode target.

8. A solar-powered thermionic-photoelectric current generator comprising:
   (a) light collecting means for collecting light incident upon a diverse area and concentrating that light into a narrow beam projecting along an optical axis,
   (b) light amplification means, situated on the optical axis so as to receive the narrow beam, for increasing the proportion of light in the narrow beam which is within the ultraviolet portion of the spectrum,
   (c) a cathode target positioned so as to intercept a major portion of the narrow beam of light as it emerges from the light amplification means,
   (d) an anode arranged substantially parallel to the beam of light incident on the cathode target and sourrounding a major portion of the cathode target,
   (e) a gas impervious envelope containing the cathode target, anode and region of space immediately surrounding the anode and cathode target for maintaining that region of space at a desired vacuum, and
   (f) electrical conductors leading from the anode and from the cathode target to points outside of the gas impervious envelope for connecting the anode and cathode target to an appropriate load.

9. The apparatus of claim 8 wherein the light amplification means comprises a pulsed mode-operated laser.

10. The apparatus of claim 9 wherein the pulsed-mode operated laser comprises a current modulated liquid crystal filter and a light actuated power source shielded from the incoming narrow beam of light by the liquid crystal filter.

11. The apparatus of claim 9 wherein the light amplification means comprises a laser situated on said optical axis such that a portion of the incoming narrow beam of light is incident on the side of the laser and a plurality of reflecting prisms situated so as to redirect all light of the incoming narrow beam not interrupted by the side of the laser to a rear end of the laser to promote stimulated emission therefrom.

12. A solar-powered light amplification means for increasing the proportion of light which is within the ultraviolet portion of the spectrum comprising:
   (a) a light collecting means for collecting light incident upon a diverse area and concentrating that light into a narrow beam projecting along an optical axis,
   (b) a laser situated on said optical axis such that at least a portion of the narrow beam of light is incident on the side of the laser,
   (c) a plurality of reflector means so as to redirect all of the narrow beam of light not intercepted by the laser to a rear end of the laser to promote stimulated emission therefrom.

* * * * *